(12) United States Patent
Kawahito (10) Patent No.: US 7,843,634 B2
(45) Date of Patent: Nov. 30, 2010

(54) AUTOMATIC FOCUS DETECTION DEVICE AND MICROSCOPE SYSTEM HAVING THE SAME

(75) Inventor: Takashi Kawahito, Fujisawa (JP)

(73) Assignee: Nikon Corporation, Tokyo (JP)

(*) Notice: Subject to any disclaimer, the term of this patent is extended or adjusted under 35 U.S.C. 154(b) by 175 days.

(21) Appl. No.: 11/206,930

(22) Filed: Aug. 19, 2005

(65) Prior Publication Data
US 2006/0039064 A1 Feb. 23, 2006

(30) Foreign Application Priority Data
Aug. 20, 2004 (JP) ............... 2004-240850

(51) Int. Cl.
*G02B 21/06* (2006.01)
(52) U.S. Cl. ............... 359/385; 250/201.3; 250/201.4; 250/201.7; 250/461.1
(58) Field of Classification Search ............ 359/383
See application file for complete search history.

(56) References Cited

U.S. PATENT DOCUMENTS

| | | | |
|---|---|---|---|
| 4,737,022 A * | 4/1988 | Faltermeier et al. | 359/387 |
| 4,958,920 A | 9/1990 | Jorgens et al. | 350/530 |
| 5,296,963 A | 3/1994 | Murakami et al. | |
| 6,252,236 B1* | 6/2001 | Trulson et al. | 506/43 |
| 6,313,944 B2 | 11/2001 | Kawahito | 359/388 |
| 6,674,574 B1 | 1/2004 | Aono | |
| 6,906,858 B2* | 6/2005 | Karaki et al. | 359/383 |
| 7,115,890 B2* | 10/2006 | Amar et al. | 250/559.38 |
| 7,456,028 B2* | 11/2008 | Fritsch et al. | 436/518 |
| 2001/0003488 A1* | 6/2001 | Yoshida | 359/381 |
| 2001/0042816 A1 | 11/2001 | Fujimoto et al. | |
| 2003/0006372 A1 | 1/2003 | Morita et al. | |
| 2003/0098921 A1 | 5/2003 | Endo | |
| 2004/0113043 A1 | 6/2004 | Ishikawa et al. | 250/201.4 |
| 2004/0145671 A1 | 7/2004 | Wang | |

FOREIGN PATENT DOCUMENTS

| | | |
|---|---|---|
| JP | 60-026311 | 2/1985 |
| JP | 63-142239 A | 6/1988 |
| JP | 05-210052 A | 8/1993 |
| JP | 07-318782 | 12/1995 |
| JP | 10-002860 A | 1/1998 |
| JP | 10-268205 A | 10/1998 |
| JP | 2995411 | 10/1999 |
| JP | 2001-091822 A | 4/2001 |
| JP | 2003-007243 | 1/2003 |

(Continued)

*Primary Examiner*—Stephone B Allen
*Assistant Examiner*—Derek S Chapel
(74) *Attorney, Agent, or Firm*—Miles & Stockbridge P.C.

(57) ABSTRACT

An AF dark field illumination device and an objective lens are moved in unity. A tissue sample in a Petri dish is illuminated by infrared light incident with an oblique angle from an LED light source. The casting of the infrared light causes scattered light from the tissue sample. A part of the scattered light passes through the objective lens, thereby forming a dark-field microscope image, which is captured by a CCD camera. The sharpness of the dark-field microscope image is dependent upon the position of the objective lens. The position of the objective lens at which the dark-field microscopic image exhibits the highest sharpness is determined to be the focus position.

11 Claims, 9 Drawing Sheets

FOREIGN PATENT DOCUMENTS

| | | |
|---|---|---|
| JP | 2003-042720 A | 2/2003 |
| JP | 2003-057552 A | 2/2003 |
| JP | 2003-270524 A | 9/2003 |
| JP | 2003-279857 A | 10/2003 |
| JP | 2004-013071 | 1/2004 |
| JP | 2004-070039 A | 3/2004 |
| JP | 2004-101406 A | 4/2004 |
| JP | 2004-233114 A | 8/2004 |

* cited by examiner

AUTOMATIC FOCUS DETECTION DEVICE AND MICROSCOPE SYSTEM HAVING THE SAME

INCORPORATION BY REFERENCE

The disclosure of the following priority application is herein incorporated by reference:

Japanese Patent Application No. 2004-240850 filed Aug. 20, 2004

BACKGROUND OF THE INVENTION

1. Field of the Invention

The present invention relates to an automatic focus detection device employed in a microscope.

2. Description of the Related Art

With devices for detecting defects such as cracks, foreign material, and so forth, on a semiconductor wafer or a metal surface, defect detect-ion devices are known having a function of automatic focusing. In Japanese Patent Application Publication No. 2003-7243 disclosed is a focus detection technique in which a laser beam is incident onto a sample so as to capture dark field images of scattered light from the sample, and the sample point is determined to be the focal point at which the dark field image exhibits the greatest brightness.

SUMMARY OF THE INVENTION

With the focus detection employed in an optical microscope for observing an organism sample (cellular tissue and so forth) stored in a culture container, there is the need to reduce damage to the cellular tissue due to the illumination light as much as possible. With the focus detection technique disclosed in the above noted prior art, a laser beam is incident on the sample with high energy density. This leads to damage to the cellular tissue or fading of fluorescent dye for staining the cellular tissue, resulting in a problem that the user cannot observe the sample without damage or change under the microscope.

An automatic focus detection device according to the first aspect of the present invention comprises: an illumination light source that emits infrared or near-infrared light; a dark field illumination system that casts illumination light emitted from the illumination light source onto a sample stored in a container; an image-capturing device that captures a dark field image of the sample through an objective lens; an adjustment device that adjusts a distance between the sample and the objective lens; a position detection device that detects the distance between the sample and the objective lens; a storage device that stores the plurality of detected distances between the sample and the objective lens as position information; and a computation device that compares a plurality of brightness signals of a predetermined number of dark field images each captured while changing the distance between the sample and the objective lens by the adjustment device and determines a specific dark field image having a maximum brightness signal, wherein the focus position, at which the objective lens is in focus on the sample, is detected based upon position information corresponding to a position, at which the maximum brightness of the dark field image is determined by the computation device, among a plurality of positions stored in the storage device as the position information.

An automatic focus detection device according to the second aspect of the present invention comprises: a first automatic focus detection device according to the first aspect of the present invention; a second automatic focus detection device that casts illumination light onto the base of the container storing the sample through the objective lens and detects light reflected from the base through the objective lens by receiving the reflected light on a photo sensor, so that the second automatic focus detection device detects the focus position, at which the objective lens is in focus on the sample, based upon the position at which the photo sensor receives the reflected light; a determination device that determines whether or not the photo sensor have received the reflected light; and a switching device that switches a focus detection by the second automatic focus detection device to the first automatic focus detection device in the event that the determination device determines that the reflected light is not detected by the photo sensor.

In the first and second aspects of the present invention, the dark field illumination system can be disposed around the perimeter of an end of a lens barrel of the objective lens.

Also, it is preferable that the dark field illumination system comprises an epi illumination system in which a part of an optical path of the epi illumination system is parallel to an optical axis of the objective lens.

Furthermore, it is preferable that the dark field illumination system comprises an annular illumination system including a light source disposed outer the lens barrel and an annual-shaped total reflection mirror disposed inner the lens barrel and reflecting light emitted from the light source as an annual-shaped light in a direction of the axis of the objective lens.

The automatic focus detection device according to the above modification can be used together with the following elements to construct a microscope system. The microscope system according to the third aspect of the present invention comprises: an epi fluorescence illumination device that emits excitation light onto the sample so as to cause emission of fluorescence, and the objective lens forming a fluorescence microscopic image of the sample. And the annual-shaped total reflection mirror is disposed between the objective lens and the epi fluorescence illumination device. It is also possible that the epi fluorescence illumination device is disposed between the objective lens and the annual-shaped total reflection mirror.

A focus detection device according to the fourth aspect of the present invention comprises: an illumination light source that emits infrared or near-infrared light; a dark field illumination system that casts illumination light, which has been emitted from the illumination light source, onto a sample; a photoelectric conversion device that detects scattered light scattered from the sample through an objective lens; and a computation device that computes a focus position, at which the objective lens is in focus on the sample, based upon electric signals converted by the photoelectric conversion device.

DESCRIPTION OF PREFERRED EMBODIMENT(S)

Description will be made below regarding an automatic focus detection device according to an embodiment of the present invention and a microscope system employing the automatic focus detection device with reference to FIGS. 1 through 9.

First Embodiment

A microscope system including an automatic focus detection device according to a first embodiment of the present invention will be explained referring to FIG. 1 through 4. Note that the devices are shown in FIGS. 1 through 4 using the three-dimensional coordinate system.

Figure 1:
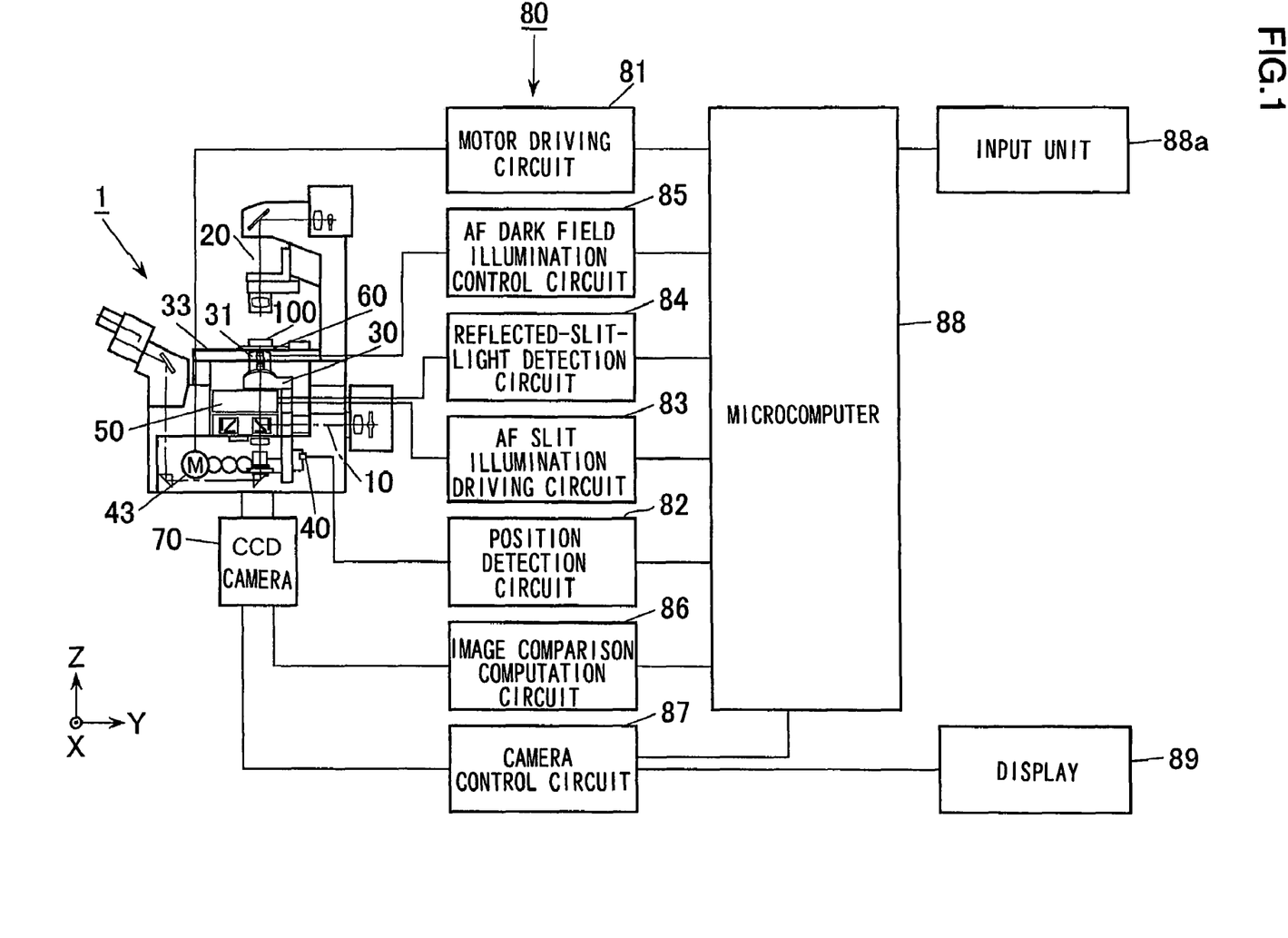
FIG. 1 is an overall configuration diagram which shows a schematic configuration of a microscope system including an automatic focus detection device according to a first embodiment of the present invention.

The microscope system comprises an optical microscope 1 and an automatic focusing (which will also be abbreviated as "AF" hereafter) control system 80.

The optical microscope 1 includes: an epi fluorescence illumination device 10; a transmitted illumination device 20; a holding unit 30 for holding an objective lens 31; a stage 33 for mounting a Petri dish 100 for storing an organism-originated tissue sample (hereinafter referred to simply as "tissue sample"); a position detection unit 40 for detecting the position of the holding unit 30 in the Z direction; a driving unit 43 for moving the holding unit 30 in the Z direction; an AF slit illumination/detection device 50; an AF dark field illumination device 60; and a charge-coupled device camera (which will be abbreviated as "CCD" hereafter) 70.

The AF control system 80 includes: a motor driving circuit 81; a position detection circuit 82; an AF slit illumination driving circuit 83; a reflected-slit-light detection circuit 84; an AF dark field illumination control circuit 85; an image comparison computation circuit 86; a camera control circuit 87; and a microcomputer 88 controlling the AF control system 80. Connected to the microcomputer 88 is an input unit 88a, through which the user can input data in the AF control system 80. Furthermore, a display 89 is connected to the camera control circuit 87.

The motor driving circuit 81 is electrically connected to a motor of the driving unit 43 so as to control the motor. The position detection circuit 82 is electrically connected to a position sensor of the position detection unit 40, thereby allowing detection of the position of the holding unit 30 along the Z axis. The AF slit illumination driving circuit 83 is electrically connected to a light-emitting diode (which will be abbreviated as "LED" hereafter) light source of the AF slit illumination/detection device 50, thereby allowing control of on/off actions and the illumination intensity of LED light source. The reflected-slit-light detection circuit 84 is electrically connected to a photo-sensor of the AF slit illumination/detection device 50, thereby allowing detection of the position of the reflected slit light on the photo-sensor.

The AF dark field illumination control circuit 85 is electrically connected to an LED light source of the AF dark field illumination device 60, thereby allowing control of on/off actions and the illumination intensity of the LED light source. The image comparison computation circuit 86 is electrically connected to an imaging device of the CCD camera 70, thereby allowing capturing images of the tissue sample at predetermined positions along the Z axis and implementing comparison/computation of the brightness (sharpness) of the captured images. The camera control circuit 87 controls the gain, the imaging timing, and so forth, for the CCD camera 70.

Figure 2:
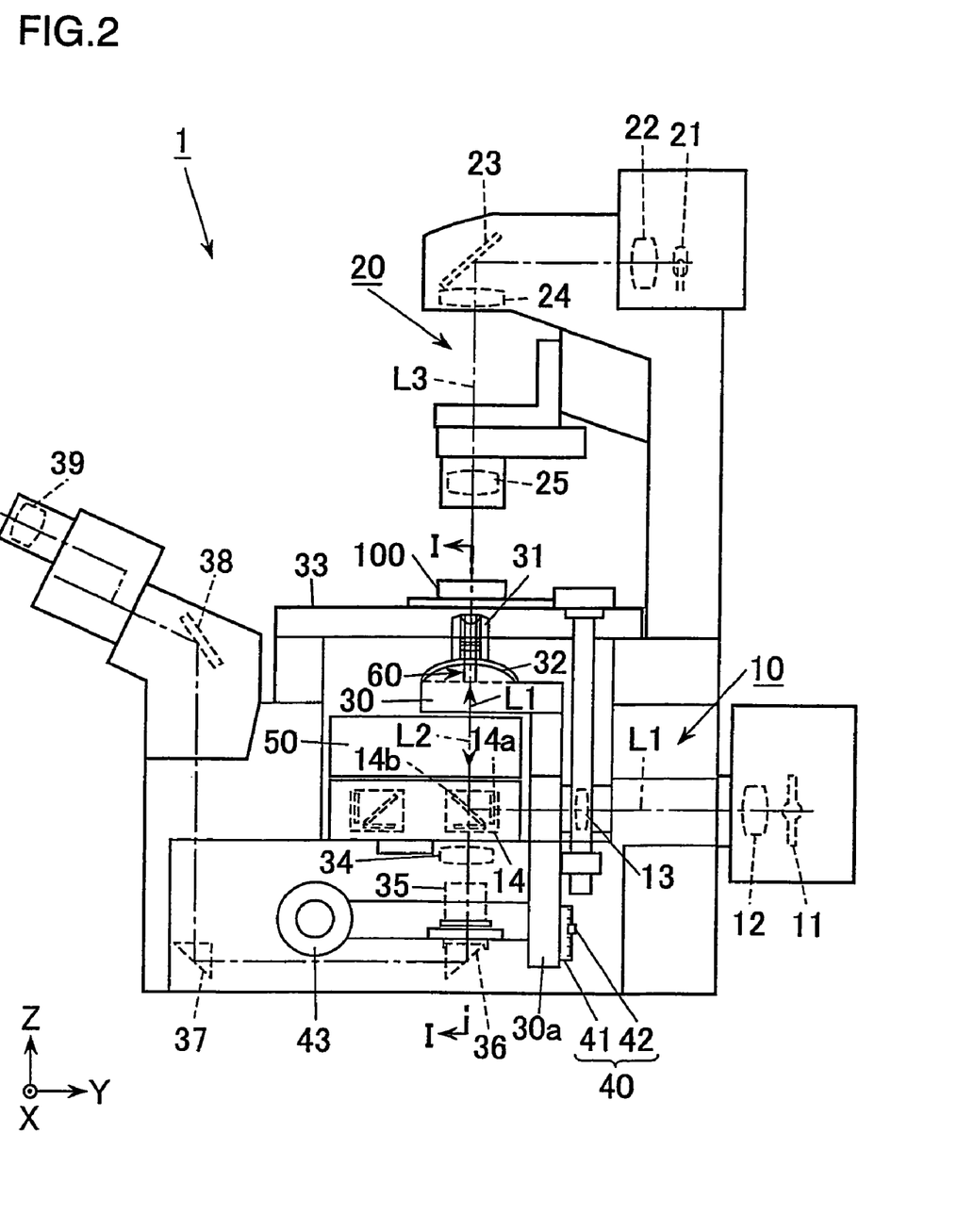
FIG. 2 is a configuration diagram which shows a schematic configuration of an optical microscope including the automatic focus detection device according to the first embodiment of the present invention.

Explanation of the optical microscope 1 will be made with reference to FIG. 2.

The epi fluorescence illumination device 10 includes: a mercury vapor lamp 11; a collector lens 12; a field lens 13; and a filter block 14 housing an excitation filter 14a and a dichroic mirror 14b. The transmitted illumination device 20 includes: a halogen lamp 21; a collector lens 22; a mirror 23; a field lens 24; and a condenser lens 25.

The objective lens 31 comprising a lens barrel an infinity optical system housed therein is mounted to a nosepiece 32 fixed on the holding unit 30. The holding unit 30 has a leg portion 30a extending in the negative Z direction. The leg portion 30a is connected to the driving unit 43, thereby allowing the leg portion 30a to be moved in the Z direction by actions of the driving unit 43. With such a configuration, the objective lens 31 is moved in the Z direction accompanying movement of the holding unit 30 in the Z direction. The stage 33 can be moved in the X-Y directions, i.e., two-dimensional directions, and the focus detection for tissue sample is made by moving the objective lens 31 in the Z direction. With the present embodiment, the position of the objective lens 31 is measured in the Z direction by the position detection unit 40. The position detection unit 40 consists of a linear scale 41 and a position sensor 42 fixed to the leg portion 30a.

Figure 3:
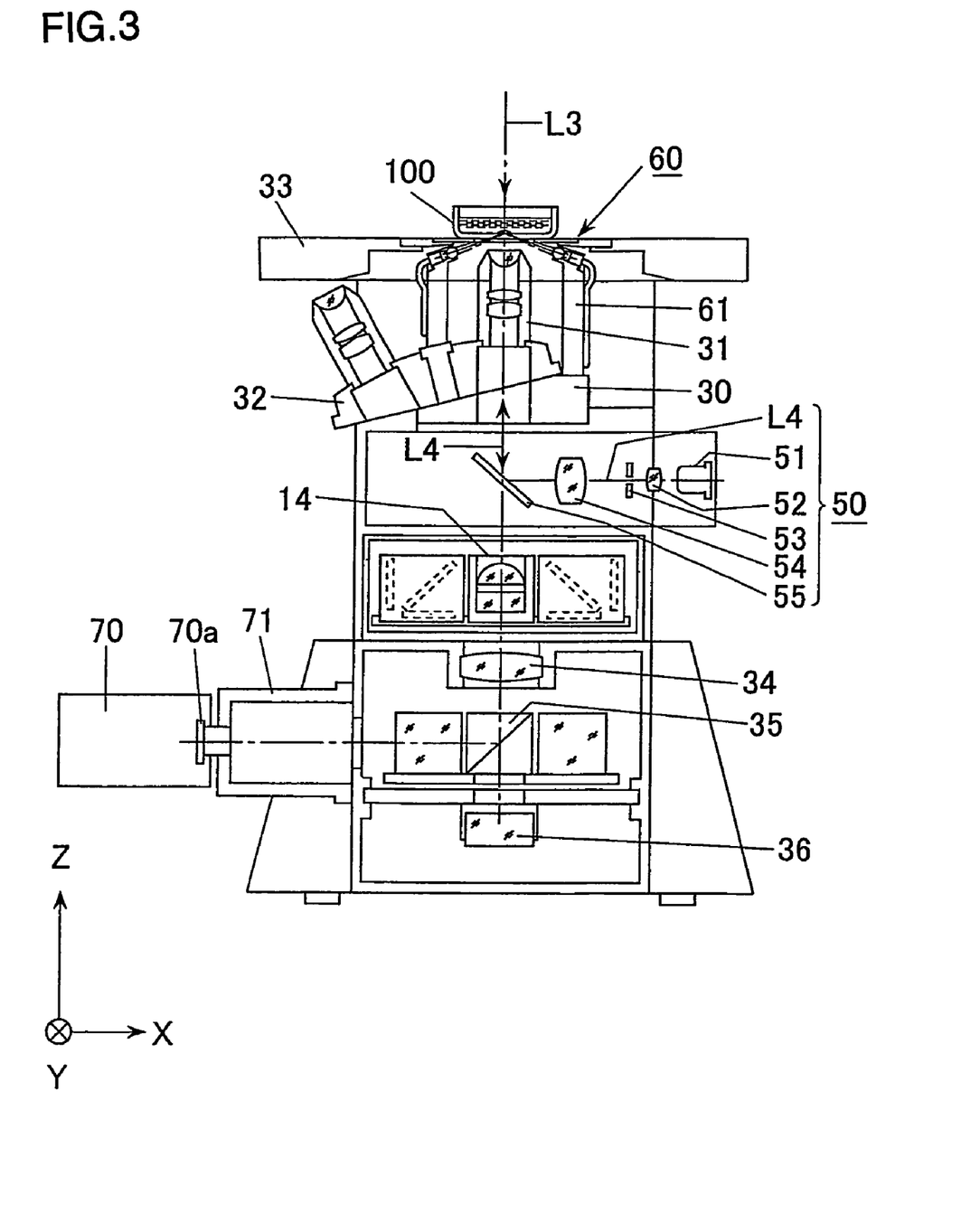
FIG. 3 is a cross-sectional view taken along line I-I in FIG. 2.

FIG. 3 shows the AF slit illumination/detection device 50 including: an LED light source 51 for emitting near-infrared light L4; a collector lens 52; a slit 53; and a dichroic mirror 55. Furthermore, the CCD camera 70 including an imaging device 70a is mounted on the left portion (in the negative X direction) of the optical microscope 1 through a cylinder 71. The AF slit illumination/detection device 50 is the first focus detection device.

The AF dark field illumination device 60 is held by a support 61 fixed on the holding unit 30. Accordingly, the AF dark field illumination device 60 is moved in the Z direction accompanying the movement of the holding unit 30 in the Z direction. The AF dark field illumination device 60 is provided around the top end of the lens barrel of the objective lens 31. The AF dark field illumination device 60 is the second focus detection device.

Figure 4:
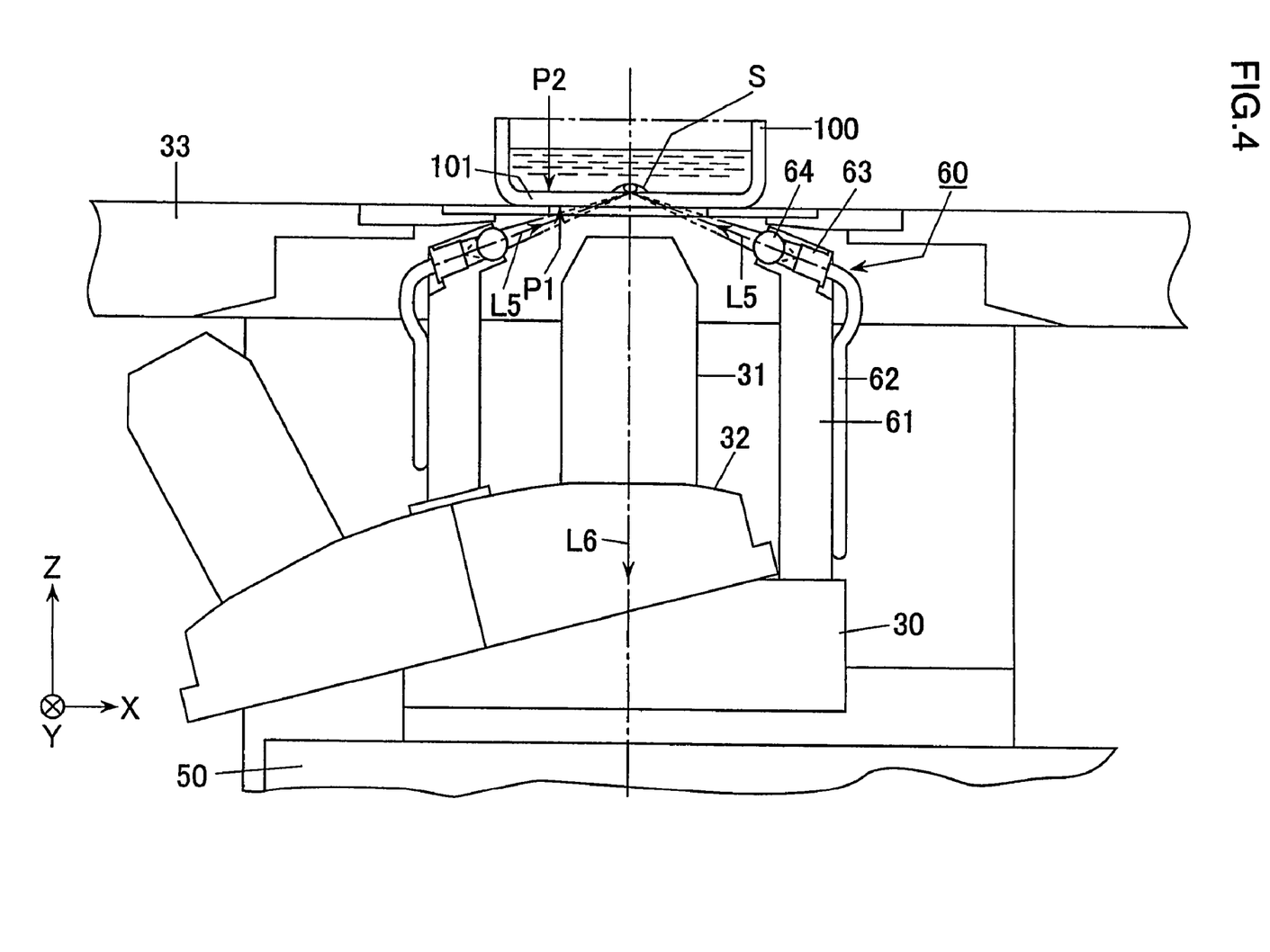
FIG. 4 is a partial enlarged cross-sectional view of a dark field illumination device 60 shown in FIG. 3.

Referring to the partial enlarged cross-sectional view shown in FIG. 4, the AF dark field illumination device 60 comprises a pair of light-source components each of which includes an LED light source 63 for emitting infrared light L5 and a condenser lens 64. The pair of light-source components is symmetrically disposed in the direction with the objective lens 31 introduced therebetween. Note that an LED light source for emitting near-infrared light may be employed as the LED light source 63. Electric power is supplied to each LED light source 63 through a power cable 62. As shown in the drawing, each infrared light from each LED light source 63 converges at a focal point of the objective lens 31.

Alternatively, the AF dark field illumination device 60 may have a configuration of an annular illumination system which emits the infrared light L5 to illuminate the tissue sample S.

In general, multiple objective lenses 31, each of which has different focal distance, are mounted on the nosepiece 32 and the user can replace a desired objective lens on the optical path by turning the nosepiece 32. With the present embodiment, as stated above both the support 61 of the AF dark field illumination device 60 and the nosepiece 32 are fixed on the holding unit 30. This configuration allows the user to switch the objective lens 31 while maintaining the converging position of the infrared light L5 at the focal point of the objective lens 31.

Alternatively, the optical microscope may have another configuration in which the relation between the converging position of the infrared light L5 and the position of the petri dish 100 can be maintained regardless switching of the objective lens 31 and adjusting of the position of the objective lens 31 in the Z direction (or the tissue sample S).

Returning to FIG. 2, description will be made regarding an illumination optical system, an observation optical system, and an AF optical system.

In case of fluorescent observation, excitation light L1 having an wavelength in an ultraviolet region, which has been emitted from the mercury vapor lamp 11, passes through the collector lens 12 and the field lens 13. Then, excitation light L1 enter the excitation filter 14a allowing the excitation light L1 having a predetermined wavelength region to pass through and enter the _dichroic mirror 14b. The dichroic mirror 14b reflects the excitation light of a predetermined wavelength region inherent to the dichroic mirror 14b toward the Z direction. Thus, the reflected excitation light is introduced into the objective lens 31 from below. The excitation light L1, which has passed through the objective lens 31, passes through the base 101 of the petri dish 100, thereby illuminating the tissue sample S. The illumination of the excitation light L1 causes emission of fluorescence L2 from the portions stained with fluorescent dye in the tissue sample S.

The fluorescence L2, which has a longer wavelength than that of the excitation light L1, passes through the base 101, and is introduced into the objective lens 31. Then, the fluorescence L2 passes through the dichroic mirror 14b and an imaging lens 34. The fluorescence L2, which has passes through the imaging lens 34, is split into two by a half prism 35. One part of the fluorescence L2 having a light quantity of 20% is introduced into an eyepiece 39 through total reflection prisms 36 and 37, and a mirror 38, thereby allowing the user to observe a fluorescent image. The other part of the fluorescence L2 having a light quantity of 80% passes in the negative X direction, and forms an image on the imaging device 70a of the CCD camera 70, thereby allowing capturing of the fluorescent image.

In transmissive observation, illumination light L3 emitted from the halogen lamp 21 is collimated into a parallel light flux by the collector lens 22. The illumination light L3 thus collimated is reflected by the mirror 23, thereby being cast onto the tissue sample S from above the petri dish 100 through the field lens 24 and the condenser lens 25. The transmitted light from the tissue sample S is introduced into the objective lens 31 through the base 101, and passes through the same optical path as with the fluorescence L2 described above, thereby allowing observation and capturing of an image of the tissue sample S. Note that a transmitted-light phase contrast microscope may employ an optical system in which the transmitted illumination device 20 is provided with a ring iris and the objective lens 31 is provided with a phase ring is conjugated with the ring iris.

Next, description will be made regarding an optical system of the AF slit illumination/detection device 50 and an optical system of the AF dark field illumination device 60.

Referring to FIG. 3, the near-infrared light L4 emitted from the LED light source 51 of the AF slit illumination/detection device 50 is converged to the slit 53 by the collector lens 52. The near-infrared light L4 adjusted in the form of slit light passes through the converging lens 54, and is reflected by the dichroic mirror 55 in the Z direction. Then, the near-infrared light L4 thus reflected is incident onto the base 101 of the petri dish 100 through the objective lens 31. Note that the slit light is split into two along the longitudinal center line. With such a configuration, one part of the slit light is shielded, and the other part thereof is used as illumination light.

Alternatively, the near-infrared light L4 employed in the present invention is not restricted to that in the form of slit light, rather an arrangement may be made employing the near-infrared light L4 in the form of spot light.

The near-infrared light (reflected slit light) L4 reflected by the base 101 passes through the objective lens 31, and is reflected by the dichroic mirror 55, thereby being introduced into a photo-sensor (not shown) included in the AF slit illumination/detection device 50. The photo-sensor is a line sensor or an area sensor having a plurality of pixels. The photo-sensor detects the incident position of the reflected slit light L4 on the photo-receptor face of the photo-sensor, which is dependent upon the reflection angle thereof. For example, in case that the reflected slit light L4 is incident on the center of the photo-receptor face of the photo-sensor, determination is made that the base 101 is positioned at the focal point of the objective lens 31, i.e., the objective lens 31 is in focus condition. The photo-sensor outputs detection results with regard to the incident position of the slit light on the photo-receptor face to the reflected-slit-light detection circuit 84. At the same time, the position sensor 42 of the position detection unit 40 outputs the position information to the position detection circuit 82, which indicates the position of the objective lens 31 in the Z direction. Thus, the detection results of the reflected slit light L4 is correlated with the position of the objective lens 31 along the Z axis.

Note that there are two types of reflected light in the reflected slit light L4. One is the first-reflected light which is reflected by the outer face P1 of the base 101. The other is the second reflected light which is reflected by the inner face P2. Description will be made later regarding detection of these two types of reflected light.

The LED light source 63 of the AF dark field illumination device 60 is supplied with electric power through the power cable 62, thereby emitting the infrared light L5. The infrared light L5 emitted from the LED light source 63 is converged by the converging lens 64, and is incident onto the tissue sample S in the petri dish 100 with an oblique angle. The infrared light L5 incident onto the tissue sample S causes scattered light L6 therefrom. A part of the scattered light L6 passes through the objective lens 31, and is introduced into the imaging lens 34 through the dichroic mirror 55 and the filter block 14, thereby forming an image. Referring to FIG. 3, the scattered light L6 reflected by the half prism 35 passes through in the negative X direction, thereby allowing the imaging device 70a of the CCD camera 70 to capture a dark field microscopic image. Such illumination for obtaining a dark field image of the sample will be referred to as "dark field illumination".

The dark field microscopic images thus obtained exhibit different sharpness depending upon the position of the objective lens 31 in the Z direction. It is needless to say that the objective lens 31 in focus condition yields the sharpest dark field microscopic image. The brightness signals from the pixels of the imaging device 70a are compared while changing the position of the objective lens 31 along the Z axis and capturing a dark field microscopic image at each position, thereby determining which microscopic image manifests the maximum sharpness (brightness) s, for example. With the present embodiment, the dark field microscopic image data is transmitted from the imaging device 70a of the CCD camera 70 to the image comparison computation circuit 86. At the same time, the position information regarding the position of the objective lens 31 along the Z axis is transmitted from the position sensor 42 of the position detection unit 40 to the position detection circuit 82. Thus, the sharpness of the microscopic image formed by the brightness signal of each pixel is correlated with the position of the objective lens 31 along the Z axis.

Explanation of an algorithm employed in the AF control system 80 according to the present embodiment will be made with reference to FIG. 5.

Figure 5:
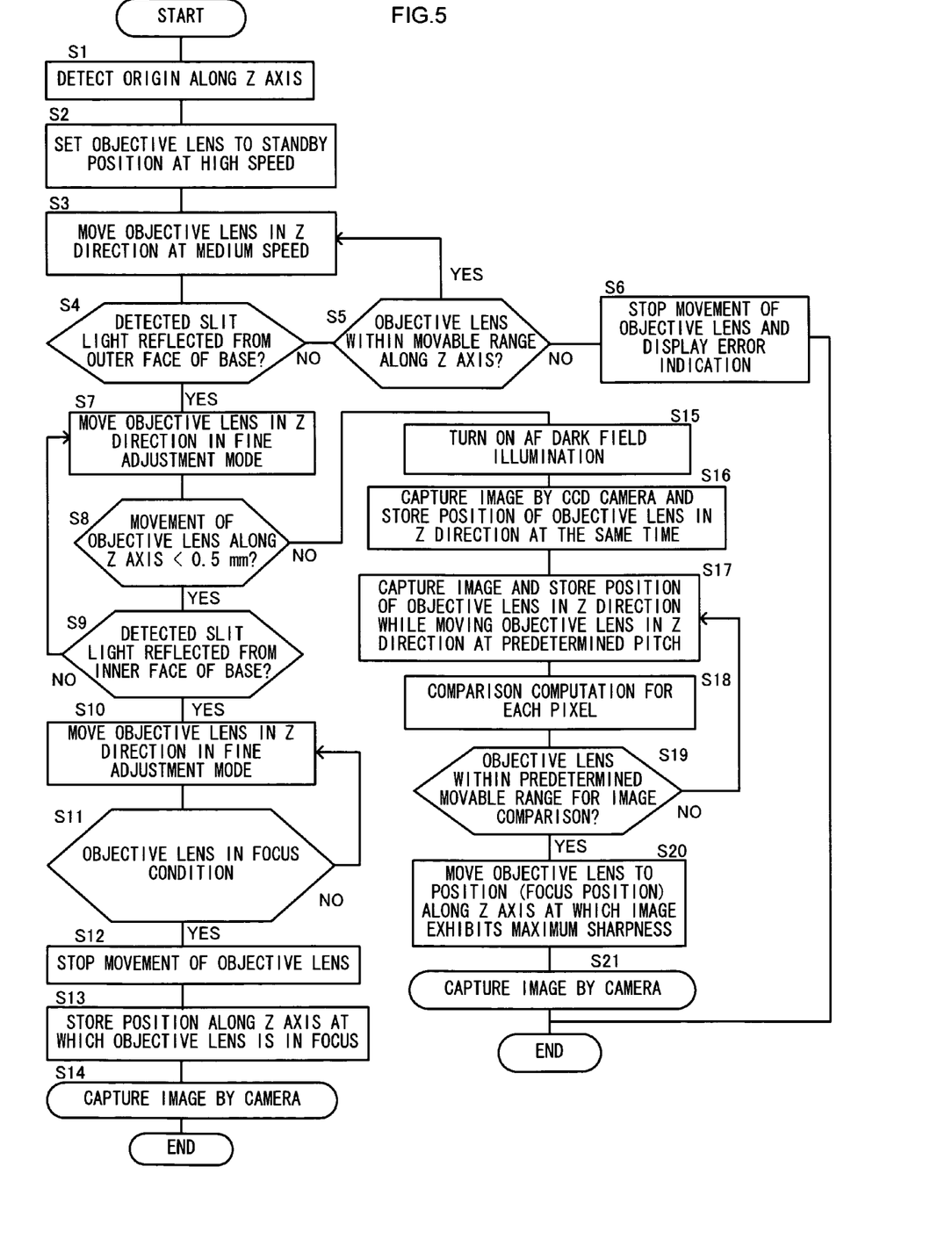
FIG. 5 is a flowchart which shows focus detection processing employed in the automatic focus detection device according to the first embodiment of the present invention.

FIG. 5 is a flowchart which shows focus detection processing employed in the automatic focus detection device according to the first embodiment. Upon the user pressing a start button (not shown) of the input unit 88a, a start signal is transmitted to the AF slit illumination/detection device 50. Upon reception of the start signal, the AF slit illumination/detection device 50 enters the operating state, thereby starting AF adjustment operation.

First, the flow proceeds to Step S1 where the origin position of the objective lens 31 is detected in the Z direction. Then, the flow proceeds to Step S2 where the objective lens 31 is moved to the standby position at a high speed. Positioning the objective lens 31 at the standby position ensures that the objective lens 31 does not come in contact with the base 101 of the petri dish 100 in a sure manner. Subsequently, the flow proceeds to Step S3 where the objective lens 31 is moved in the positive Z direction at a medium speed.

Then, the flow proceeds to Step S4 where determination is made whether or not the first reflected light is detected. The first reflected light is slit light L4 reflected from the outer face P1 of the base 101 of the petri dish 100. In the event that determination has been made that the first reflected light is not detected, the flow proceeds to Step S5. In Step S5, determination is made whether or not the objective lens 31 is within a predetermined movable range thereof along the Z axis. In the event that determination has been made that the objective lens 31 is out of the movable range thereof, the flow proceeds to Step S6. In Step S6, the objective lens 31 is stopped, an error indication is displayed, and the processing ends.

On the other hand, in Step S5, in the event that determination has been made that the objective lens is within the movable range thereof along the Z axis, the flow returns to Step S3 where the objective lens is further moved in the positive Z direction.

On the other hand, in Step S4, in the event that determination has been made that the first reflected light is detected, the flow proceeds to Step S7 where the objective lens 31 is further moved in the positive Z direction at a fine pitch in the fine adjustment mode. Movement of the objective lens 31 in the fine adjustment mode is limited to a certain distance determined with a reference position thereof at which the first reflected light has been detected, giving consideration to the thickness of the base 101 of the petri dish 100. Let us say that the movement of the objective lens 31 in the fine adjustment mode is limited to 0.5 mm, for example. In Step S8, determination is made whether or not the movement of the objective lens 31 is less than 0.5 mm. In the event that determination has been made that the movement of the objective lens 31 is not less than 0.5 mm, i.e., in the event that the second reflected light has not been detected over a range equal to or greater than 0.5 mm, the focus detection processing using reflected-slit-light detection is cancelled, and the flow proceeds to Step S15 where the focus detection processing is switched to that using the AF dark field illumination device 60. Note that petri dishes 100 formed of plastic or the like, for example, having an inner face P2 of the base 101 with poor planarity, often leads to such a situation. The processing following Step S15 will be explained later.

In Step S9, determination is made whether or not the second reflected light is detected. The second reflected light is the slit light L4 reflected from the inner face P2 of the base 101 of the petri dish 100. In the event that determination has been made that the second reflected light is not detected, the flow returns to Step S7 where the objective lens 31 is further moved in the positive Z direction. On the other hand, in Step S9, in the event that determination has been made that the second reflected light is detected, the flow proceeds to Step S10 where the objective lens 31 is further moved in the positive Z direction. In Step S11, determination is made whether or not the objective lens 31 is focused on the inner face P2 of the base 101. In the event that determination has been made that the objective lens 31 is out of focus, the flow returns to Step S10. On the other hand, in Step S11, in the event that determination has been made that the objective lens 31 is in focus, the flow proceeds to Step S12 where the objective lens 31 is stopped. Then, the flow proceeds to Step S13 where the position of the objective lens 31 in focus is stored. Subsequently, the flow proceeds to Step S14 where the epi fluorescence illumination device 10 or the transmitted illumination device 20 started up, thereby capturing a microscopic image.

The above description has been made regarding the focus detection processing using the AF slit illumination/detection device 50 alone. As described above, in some cases, such an arrangement leads to a situation that the flow proceeds from Step S8 to Step S15 due to irregularities of the inner face P2 of the base 101 of the petri dish 100.

Description will be made regarding focus detection processing using the AF dark field illumination device 60. In Step S15, the AF dark field illumination device 60 enters the operating state. Then, the flow proceeds to Step S16 where the CCD camera captures a dark field image as well as storing the position of the objective lens 31. Then, the flow proceeds to Step S17 where the objective lens 31 is repeatedly moved at a predetermined pitch so that a dark field image is captured and the position of the objective lens 31 is stored for each position.

Then, the flow proceeds to Step S18 where comparison computation is performed for the dark field images each time that a dark field image is captured while moving the objective lens 31. With such comparison computation according to the present embodiment, the brightness may be compared at pixels in each predetermined area of respective dark field images thus captured, i.e., difference in the brightness may be computed between the dark field images. Alternatively an arrangement may be made in which difference in the contrast is computed for and compared between the dark field images.

Subsequently, the flow proceeds to Step S19 where determination is made whether or not the objective lens 31 reaches the end of the predetermined movable range. In the event that determination has been made that the objective lens 31 does not reach the end of the predetermined movable range, the flow returns to Step S17 where the objective lens 31 is further moved in the positive Z direction. On the other hand, in Step S19, in the event that determination has been made that the objective lens 31 reaches the end of the predetermined movable range, the flow proceeds to Step S20. In Step S20, the objective lens 31 is moved to the position at which the dark field image has exhibited the maximum brightness along the Z axis. Subsequently, the flow proceeds to Step S21 where the epi fluorescence illumination device 10 or the transmitted illumination device 20 is started up, thereby capturing a microscopic image.

The focus detection using the AF dark field illumination device 60 as described above has the advantage as follows. That is to say, such focus detection has the advantage of allowing adjustment of the objective lens 31 so as to be focused on the organic sample S which is to be observed, regardless of irregularities of the base 101 of the petri dish 100. In other words, the focus detection using the AF dark field illumination device 60 allows the user to adjust the object lens 31 to be in focus using neither reflection from the inner face P1 of the base 101 of the petri dish 100 nor reflection from the outer face P2 thereof. Furthermore, with such focus detection, infrared light having small energy is cast onto the tissue sample S as illumination light, thereby allowing illumination of the tissue sample S without damage to the tissue sample S or fading of fluorescent dye.

Furthermore, the focus detection using both the AF slit illumination/detection device 50 and the AF dark field illumination device 60 has the advantage as follow. With such an arrangement, in the first stage, focus detection is made using the reflected-slit-light detection method which has the advantage of short processing time from detection up to computation of the focus position of the objective lens 31. In the second stage, focus detection is made using the AF dark field illumination device 60. Such an arrangement has the advantage of short processing time for focus detection in various situations. For example, let us say that the tissue sample S is placed on a slide plate with high planarity. In this case, focus detection is completed in the first stage alone, i.e., focus detection is made using the AF slit illumination/detection device 50 alone. This enables focus detection in short processing time.

Second Embodiment

Figure 6:
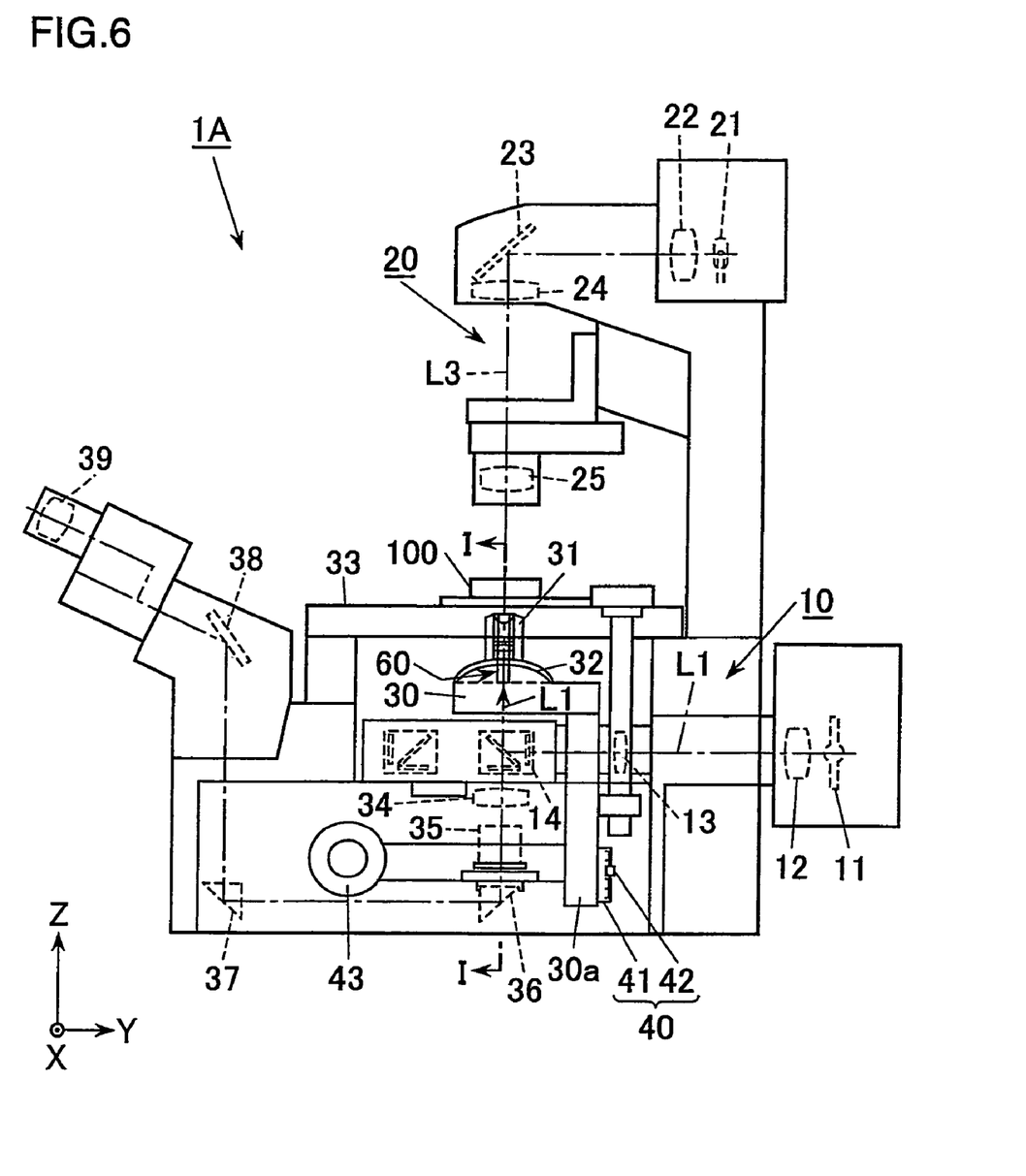
FIG. 6 is a configuration diagram which shows a schematic configuration of an optical microscope including an automatic focus detection device according to a second embodiment of the present invention.
Figure 7:
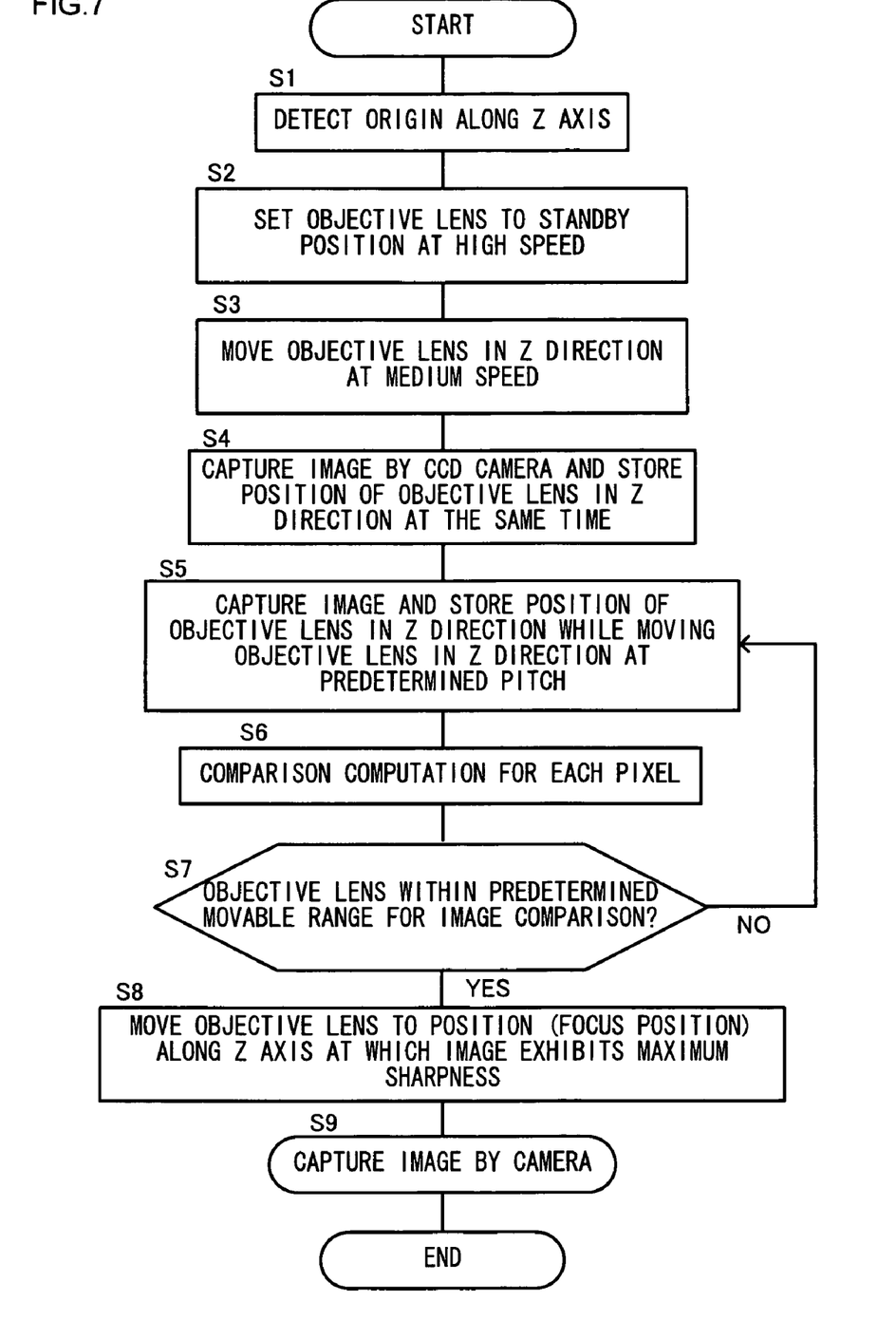
FIG. 7 is a flowchart which shows focus detection processing employed in the automatic focus detection device according to the second embodiment of the present invention.

A microscopic system according to the present embodiment includes an optical microscope 1A and an AF control system for controlling an automatic focus detection device. FIG. 6 is a configuration diagram which shows a schematic configuration of the optical microscope 1A including the automatic focus detection device according to the second embodiment. FIG. 7 is a flowchart which shows focus detection processing employed in the automatic focus detection device according to the second embodiment.

The optical microscope 1A has the same configuration as that of the optical microscope 1 (see FIG. 2) described in the first embodiment, except for omission of the AF slit illumination/detection device 50. Accordingly, the AF control system according to the present embodiment has the same configuration as that of the AF control system 80 shown in FIG. 1, except for omission of the AF slit illumination driving circuit 83 and the reflected-slit-light detection circuit 84. Note that the same components are denoted by the same reference numerals, and description thereof will be omitted.

With the automatic focus detection device according to the present embodiment, focus detection is made using the AF dark field illumination device 60 alone. The processing for the focus detection according to the present embodiment is generally the same as that using the AF dark field illumination device 60 according to the first embodiment.

Description will be made below with reference to the flowchart shown in FIG. 7. Upon the user pressing a start button (not shown) of the input unit 88a, a start signal is transmitted to the AF dark field illumination device 60. Upon reception of the start signal, the AF dark field illumination device 60 enters the operating state, thereby starting AF adjustment operation. First, the flow proceeds to Step S1 where the origin position of the objective lens 31 is detected in the Z direction. Then, the flow proceeds to Step S2 where the objective lens 31 is moved to the standby position at a high speed. Subsequently, the flow proceeds to Step S3 where the objective lens 31 is moved in the positive Z direction at a medium speed. With the first embodiment, the same processing is performed by the AF slit illumination/detection device 50 for detection of reflected slit light. On the other hand, with the present embodiment, the aforementioned processing is performed for moving the objective lens 31 to the first position at which a dark field image is to be captured by the CCD camera.

The automatic focus detection device according to the present embodiment has the same advantage as that of the AF dark field illumination device 60 of the automatic focus detection device according to the first embodiment. Furthermore, with the automatic focus detection device according to the present embodiment, focus detection is made using the AF dark field illumination device 60 alone, thereby enabling the size of the optical microscope 1A to be reduced, as well as realizing a simple algorithm for focus detection.

Figure 8:
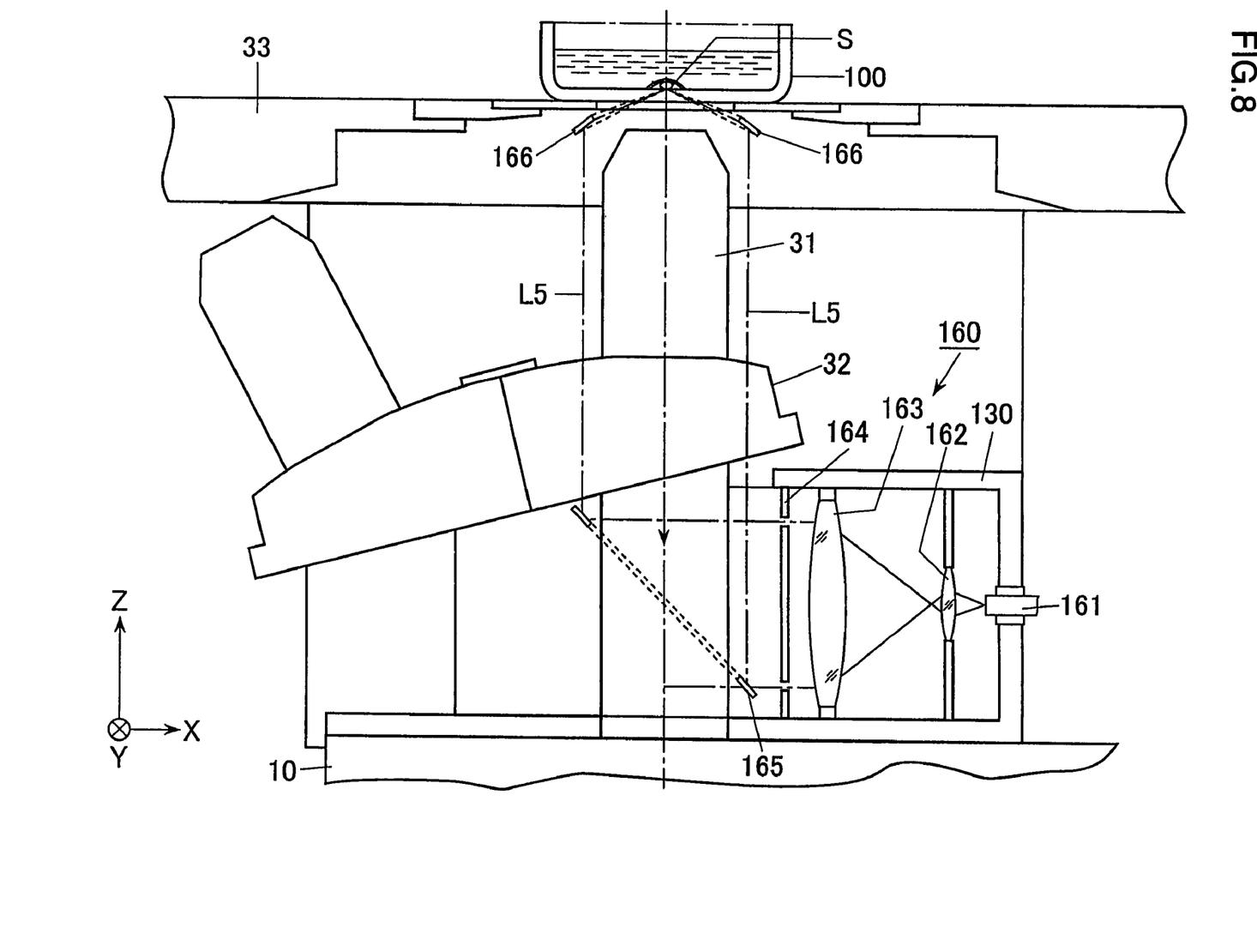
FIG. 8 is a diagram which shows a modification of the AF dark field illumination device 60 according to the embodiment of the present invention.

Description will be made regarding a modification of the AF dark field illumination device 60 having another configuration with reference to FIG. 8. FIG. 8 shows a modification according to the present embodiment, and specifically, is a partial enlarged cross-sectional view which shows an AF dark field illumination device 160. The nosepiece 32 for mounting the objective lens 31 is fixed on the holding unit 130. The AF dark field illumination device 160 has a configuration of an epi illumination system for casting the infrared light L5 onto the tissue sample S along the optical axis in the Z direction. The epi illumination system comprises a first-stage optical system included within the holding unit 130 and a second-stage optical system disposed around the lens barrel of the objective lens 31.

The first-stage optical system includes: an LED light source 161 for emitting infrared light; a converging lens 162; a collimator lens 163; a slit plate 164 on which a ring-shaped slit is formed; and a doughnut-shaped or a ring-shaped total reflection mirror 165. The second-stage optical system includes a total reflection mirror 166 alone. The infrared light L5 emitted from the LED light source 161 is converged by the converging lens 162 and the infrared light L5 thus converged is collimated into a parallel light flux by the collimator lens 163. Then the infrared light L5 with an annular cross-sectional shape is formed by the slit plate 164 and is reflected by the total reflection mirror 165 in the Z direction to pass through the outer space around the perimeter of the lens barrel of the objective lens 31. Then, the infrared light L5 thus introduced is reflected by the total reflection mirror 166 disposed around the end of the lens barrel of the objective lens 31 toward the sample S, thereby obtaining annular illumination. In the epi illumination system employed in the AF dark field illumination device 160 according to the present embodiment, spot illumination as shown in FIG. 4 can be used in lieu of annular illumination.

With the AF dark field illumination device 160 employing the epi illumination system, the AF dark field illumination device can be arranged at the desired space within the optical microscope 1 or 1A, thereby improving the degree-of-freedom from the perspective of design. For example, the microscope system may be designed such that the AF dark field illumination device 160 is disposed between the objective lens 31 and the epi fluorescence illumination device 10 as shown in FIG. 8. Instead, the microscope system may be designed with a different layout from that shown in FIG. 8. For example, the AF dark field illumination device 160 may be disposed underneath the epi fluorescence illumination device 10.

With an arrangement in which the automatic focus detection device includes the AF slit illumination/detection device 50 and the AF dark field illumination device 160, an arrangement may be made in which the AF slit illumination/detection device 50 and the AF dark field illumination device 160 are disposed at the same level along the Z axis or opposite to one another with the same illumination optical axis. In order to provide such an arrangement, for example, the AF slit illumination/detection device 50 and the AF dark field illumination device 160 are disposed. The near-infrared light L4 emitted from the LED light source 51 of the AF slit illumination/detection device 50 passes through in the positive X direction and the infrared light L5 emitted from the AF dark field illumination device 160 passes through in the negative X direction. In addition to this design, the dichroic mirror 55 of the AF slit illumination/detection device 50 may be disposed on the inner side of the doughnut-shaped total reflection mirror 165.

With such a layout, the AF slit illumination/detection device 50 and the AF dark field illumination device 160 are not disposed serially in the Z direction, and are disposed with generally the same height. This enables design of the optical microscope with a reduced length (height) in the Z direction.

Figure 9:
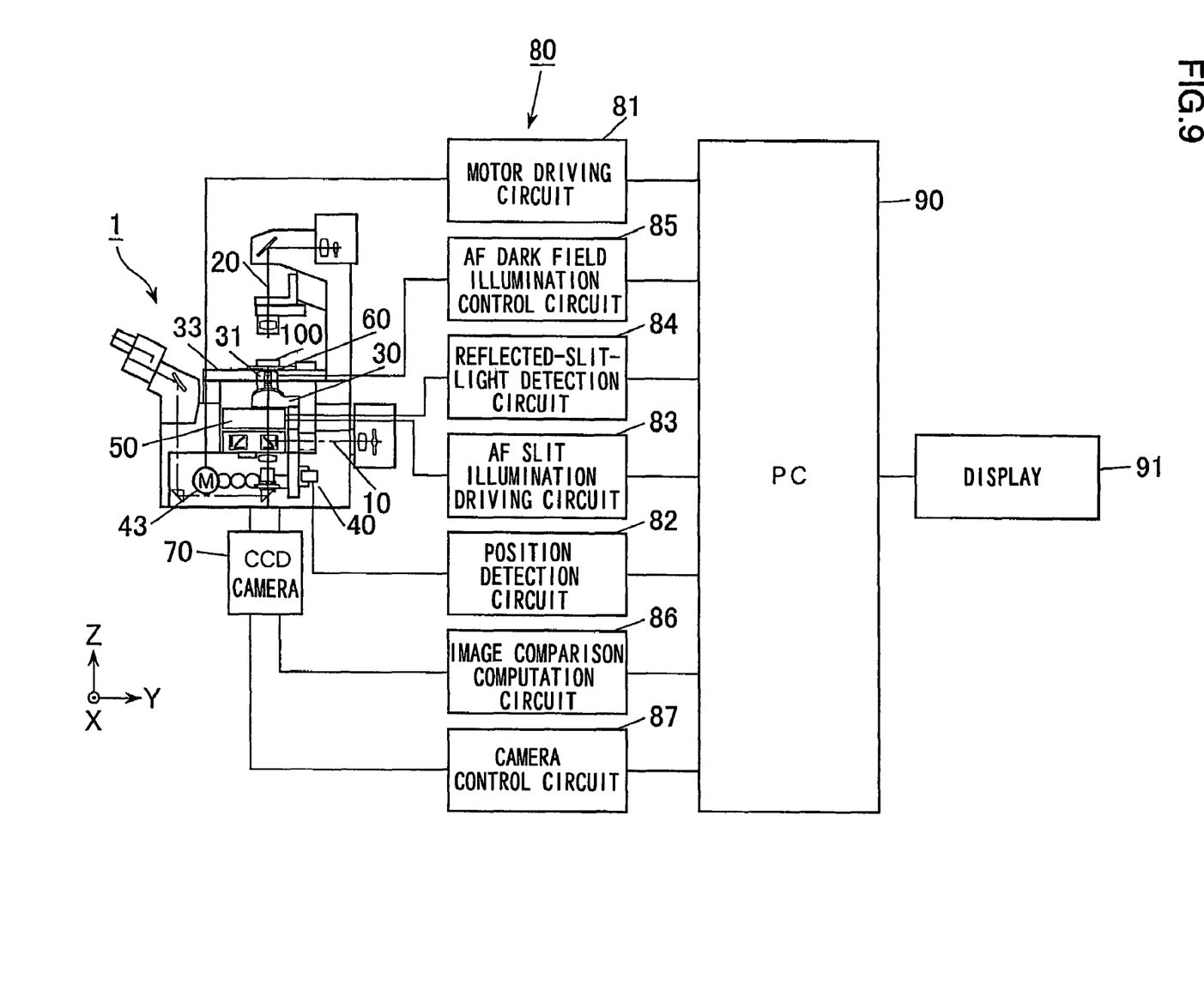
FIG. 9 is a diagram which shows a modification of the microscope system including the automatic focus detection device according to the embodiment of the present invention.

Description will be made regarding a modification of a microscope system having another configuration with reference to FIG. 9. The microscope system as shown in FIG. 9 comprises a PC 90 instead of the microcomputer 88 of the microscope system according to the first embodiment shown in FIG. 1. The PC 90 comprises an unshown input unit and a display 91 and centrally implements a focus detection algorithm employed in the AF control system 80. With such an arrangement, the microscope system simply has the same advantage as that of the microscope system according to the first embodiment by connecting a commercially-available PC 90 to the AF control system 80. Also, such a modification may be applied to the second embodiment, thereby having the same advantage as stated above.

While description has been made regarding a device having a function of automatic focus adjustment, the dark field illumination device 60 or 160 may be employed in a device not having a function of focus adjustment but simply having a focus detection. With such a focus-detection device, the infrared light L5 is cast onto the organism sample from the dark field illumination device 60 or 160, and the scattered light L6 from the organism sample is received by a photo-sensor through the objective lens 31, thereby converting the received light into electric signals by the photo-sensor. Note that the magnitude of the electric signal is proportional to the intensity of the scattered light L6 thus received. The intensity of the received light is measured while changing the distance between the organism sample and the objective lens 31, so that the focal point at which the objective lens 31 is in focus on the organism sample can be found, since the received light thereat exhibits the maximum intensity. Upon detection of the maximum intensity of the scattered light L6 thus received, focus-detection processing ends.

Note that such a focus detection device has no need to capture an image formed of the scattered light L6. Accordingly, an arrangement may be made in which the CCD camera 70 according to the aforementioned embodiments is replaced with such a photo-sensor having a smaller number of pixels, whose detection signal allows computation of the focus position.

Note that the present invention is not restricted to any arrangement described in the aforementioned embodiments; rather, various arrangements and modifications may be made without departing from the features of the present invention.

What is claimed is:

1. A microscope system comprising:

an observation optical system including an objective lens;

an illumination light source for autofocusing that is disposed around the perimeter of an end of a lens barrel of the objective lens, emits infrared or near-infrared light, and converges the light at a focus position of the objective lens;

a dark field illumination system for autofocusing that obliquely casts illumination light emitted from the illumination light source for autofocusing onto a biological sample stored in a container so that the illumination light for autofocusing does not pass through the objective lens;

an image-capturing device that captures a dark field image of the sample through the objective lens;

an adjustment device that adjusts a distance between the sample and the objective lens;

a storage device that stores a plurality of detected distances between the biological sample and the objective lens as position information; and a computation device that compares a plurality of brightness signals of a predetermined number of dark field images each captured while changing the distance between the sample and the objective lens by the adjustment device and determines a specific dark field image having a maximum brightness signal; wherein the focus position, at which the objective lens is in focus on the biological sample, is detected based upon the maximum brightness signal, the dark field illumination system includes an epi-illumination system in which a part of an optical path of the epi-illumination system is parallel to an optical axis of the objective lens, the epi-illumination system includes an epi-fluorescence illumination device that includes an excitation light source emitting ultraviolet rays onto the sample through the objective lens so as to cause emission of fluorescence, the fluorescence being observed through the objective lens, and casting the excitation light emitted from the excitation light source to the biological sample is started up after the focus detection is performed according to images formed by the illumination light for autofocusing cast to the sample without passing through the objective lens and captured by the image-capturing device through the objective lens under dark field illumination using the infrared or near infrared light from the dark field illumination system for autofocusing.

2. A microscope system according to claim 1, further comprising:

a holding unit;

a nosepiece that is revolvably fixed on the holding unit and has mounted thereon the objective lens through which the dark field image for autofocusing is captured and the fluorescence image for fluorescence observation is obtained; and a driving unit connected to the holding unit and capable of translating in a direction of an optical axis of the objective lens, wherein the holding unit includes a support to support the illumination light source for autofocusing.

3. A microscope system according to claim 1, wherein the illumination light source comprises a pair of light-source components each including a light-emitting diode light source disposed with the objective lens therebetween.

4. A microscope system according to claim 3, further comprising:

a power cable connected to the light-source components, for supplying electric power to the light-emitting diode light sources.

5. A microscope system according to claim 1, further comprising:

an automatic focus detection device that casts illumination light onto a base of the container storing the sample through the objective lens and detects light reflected from the base through the objective lens by receiving the reflected light on a photo-sensor, thereby detecting a focus position at which the objective lens is in focus on the sample, based upon a position at which the photo-sensor receives reflected light;

a determination device that determines whether or not the photo-sensor has received the reflected light; and a switching device that switches an operation in which a focus position is detected, by the automatic focus detection device to an operation in which a focus position is detected based upon the maximum brightness signal in the event that the determination device determines that reflected light is not detected by the photo-sensor.

6. A microscope system according to claim 1, wherein the dark field illumination system comprises:

a first-stage optical system included within a holding unit for the objective lens; and a second-stage optical system disposed around the lens barrel of the objective lens.

7. A microscope system comprising:

a support for supporting a stage capable of mounting thereon a container that contains a biological sample to be observed, an observation optical system for observing the biological sample to be observed, including an objective lens with a lens barrel, a first illumination light source capable of emitting excitation light for producing fluorescence, and an epi-illumination device that casts the excitation light from the first illumination light source onto the biological sample through the objective lens to cause emission of the fluorescence, the fluorescence from the biological sample being observed through the objective lens;

an autofocusing system including a second illumination light source for autofocusing capable of emitting illumination light for autofocusing which is less harmful to the biological sample than the excitation light for producing fluorescence, a dark field illumination device for autofocusing that obliquely casts the illumination light for autofocusing from the second illumination light source toward the biological sample, and converges the illumination light for autofocusing at a focus position of the objective lens, so that the illumination light for autofocusing does not pass through the objective lens, an image-capturing device that captures through the objective lens a dark field image of the biological sample formed by the illumination light for autofocusing scattered from the biological sample, a control system that detects the focus position at which the objective lens is in focus based upon a maximum brightness signal obtained by comparing a plurality of dark field images captured by the image-capturing device, wherein the dark field illumination system includes an epi-illumination system in which a part of an optical path of the epi-illumination system is parallel to an optical axis of the objective lens, the excitation light cast by the epi-illumination device passes through the epi-illumination system in parallel to the optical axis of the objective lens, and casting the excitation light emitted from the excitation light source to the biological sample is started up after the focus detection is performed according to images formed by the illumination light for autofocusing cast to the biological sample without passing through the objective lens and captured by the image-capturing device through the objective lens under dark field illumination using the light less harmful to the biological sample from the dark field illumination system.

8. A microscope system according to claim 7, further comprising:

a holding unit;

a nosepiece that is revolvably fixed on the holding unit and has mounted thereon the objective lens; and a driving unit connected to the holding unit and capable of translating in a direction of the optical axis of the objective lens, wherein the holding unit includes a support that is capable of supporting the second illumination light source for autofocusing.

9. A microscope system according to claim 7, wherein the excitation light for producing fluorescence includes ultraviolet ray.

10. A microscope system according to claim 7, wherein the illumination light for autofocusing which is less harmful to the biological sample than the excitation light for producing fluorescence is infrared or near-infrared light.

11. A microscope system according to claim 7, wherein the control system comprises:

an adjustment device that adjusts a distance between the biological sample and the objective lens, a position detection device that detects the distance between the sample and the objective lens, a storage device that stores the plurality of detected distances between the biological sample and the objective lens as position information, and a computation device that compares a plurality of brightness signals of a predetermined number of dark field images each captured while changing the distance between the sample and the objective lens by the adjustment device and determines a specific dark field image having a maximum brightness signal.

* * * * *